C. F. ROPER, DEC'D.
R. R. CONANT AND W. F. ROPER, EXECUTORS.
AIR SUPPLYING MEANS FOR MOTORS.
APPLICATION FILED MAR. 6, 1915.
1,318,596. Patented Oct. 14, 1919.
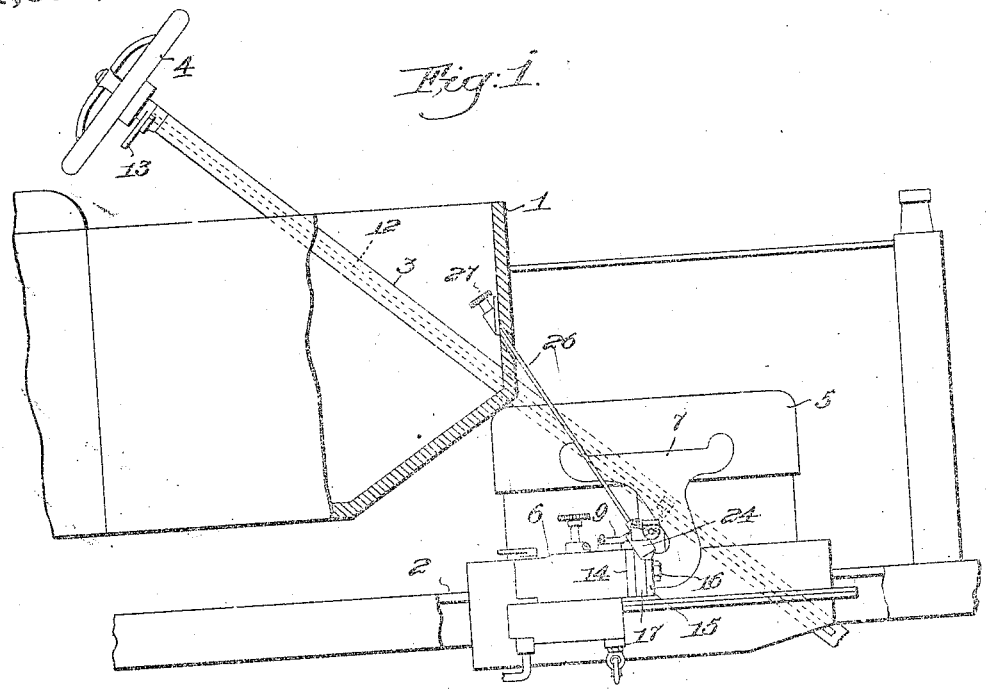
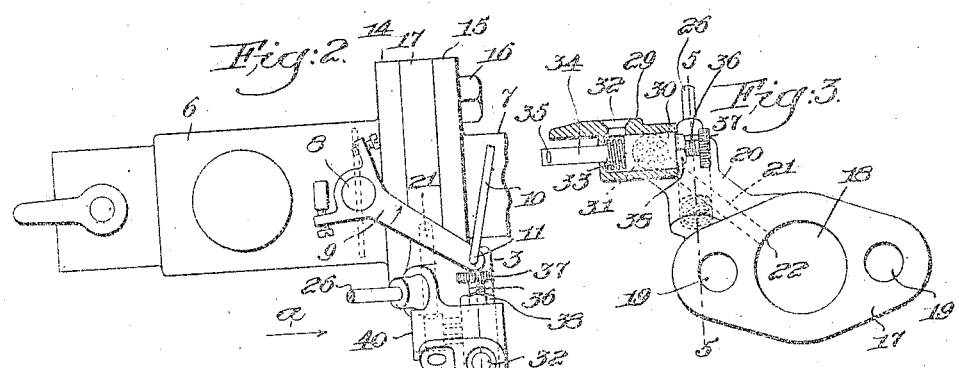
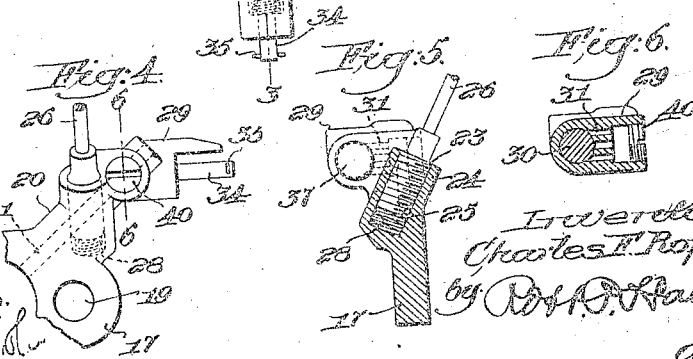

UNITED STATES PATENT OFFICE.

CHARLES F. ROPER, OF HOPEDALE, MASSACHUSETTS; BESSIE R. CONANT AND WALTER F. ROPER, EXECUTORS OF SAID CHARLES F. ROPER, DECEASED, ASSIGNORS TO HOPEDALE MANUFACTURING COMPANY, OF MILFORD, MASSACHUSETTS.

AIR-SUPPLYING MEANS FOR MOTORS.

1,318,596.      Specification of Letters Patent.      Patented Oct. 14, 1919.

Application filed March 6, 1915. Serial No. 12,623.

*To all whom it may concern:*

Be it known that I, CHARLES F. ROPER, a citizen of the United States, residing at Hopedale, county of Worcester, and State of Massachusetts, have invented an Improvement in Air-Supplying Means for Motors, of which the following description, in connection with the accompanying drawings, is a specification, like letters on the drawings representing like parts.

The invention to be hereinafter described relates to combustion engines or motors wherein the fuel is composed of a mixture of air and a combustible fluid; and more particularly, it relates to the means for controlling the character of the mixture or the proportion of air and fuel composing such mixture.

In the ordinary operation of a combustion engine or motor, a mixture of air and fuel is supplied to the cylinder through an intake, and the volume of the supply is controlled by a throttle valve, while the character of the mixture or the proportion of air and fuel is controlled by fixed adjustments of the carbureter. Under varying conditions of use, the engine will be called upon to operate under different loads, and at different speeds, and traverse widely varying characters of roads. It is evident, therefore, that the established proportion of air and fuel, as determined by the fixed adjustment at the carbureter, will not be suitable to economically respond to these widely varying conditions, because, while a mixture of one proportion of air and fuel may be well adapted for a certain load or speed, it becomes too rich or too poor for other loads and speeds, so that at times waste of fuel results, and at other times the efficiency of the motor is impaired. In cold weather, also, difficulty will be experienced in starting the motor on a mixture that might be fairly satisfactory for ordinary running conditions.

With these considerations in mind, the present invention aims to provide means whereby the proportion of air and fuel forming the mixture may be readily and easily controlled and varied in response to varying conditions, so that economy of fuel consumption may result and the efficiency of the motor be fully maintained. The various features of the invention will best be made clear from the following description and accompanying drawing of one form of means for carrying the invention into practical effect, the illustrated details being variable, within the true scope of the invention as defined by the claims.

In the drawings:—

Figure 1 is a view in side elevation and part section, showing portions of an automobile provided with a motor or combustion engine having the present invention associated therewith;

Fig. 2 is an enlarged plan view showing portions of the carbureter, intake pipe connecting with the engine, and the present invention applied to the parts;

Fig. 3 is a detached view showing features of the present invention in elevation and others in section, as on the line 3—3, Fig. 2;

Fig. 4 is a side elevation showing features of the present invention looking in the direction of the arrow $a$, Fig. 2, some of the parts being broken away;

Fig. 5 is a section on the line 5—5, Fig. 3; and

Fig. 6 is a section on the line 6—6, Fig. 4.

In exploitation of the present invention, it has been shown and described as associated with the motor of an automobile, but it is adapted for use in connection with any combustion engine, such as those in motor-boats, and other associations.

Referring to the drawings: 1 designates the body of an automobile or other vehicle mounted upon a frame or running gear, which may be supplied with the usual wheels, axles, and other structural features common thereto, and being well understood, need not be here described. The vehicle may be supplied with the usual steering post 3 and steering wheel 4.

Mounted upon the frame or running gear 2 is the motor 5, which is of the combustion engine type, connected to the fuel supplying means or carbureter 6 by means of the intake pipe or manifold 7, a throttle valve being provided to control the volume of mixture that may be drawn from the supplying means through the intake pipe to the engine. In the form of the invention illustrated, the throttle stem 8 carries the usual throttle, and has connected thereto an operating arm 9 by which the throttle may be manipulated through a suitable rod 10 joined to the arm 9 at 11, and leading to a convenient position within reach of the operator. In the illustration, the throttle rod 10 is shown as connected to a rocking stem 12 extending toward the top of the steering post 3, and provided with an operating hand-piece 13 by which the throttle may be readily controlled. These features may be variously formed and arranged, the only essential being that a proper hand or foot control of the throttle be provided, as well understood by those skilled in the art.

The fuel supplying means or carbureter 6 is connected to the intake pipe 7 leading to the engine by means of flanges 14 and 15 clamped in operative and assembled relation by suitable bolts 16 or other means, the construction being such that the suction of the engine may draw from the supply or carbureter a volume of mixture determined by the position of the throttle.

The present invention contemplates means for altering or changing the proportion of air and fuel, according to the demands of the condition existing at the time, as will more fully appear; and while the said means may assume various forms, it is desirable that it be such that may be readily applied without changing the parts with which it is associated, and a good practical embodiment of the invention in this respect will now be described.

Cast or otherwise formed is a part 17, Fig. 3, provided with an opening 18 adapted to register with the opening leading from the carbureter to the intake pipe, and having the two side openings 19, 19 through which the bolts 16 may pass. The part 17, thus formed, is adapted to be clamped between the flanges 14 and 15 connecting the carbureter and intake pipe, and for identification may be hereinafter referred to as the flange piece.

Extending from the flange piece 17, is a part 20 having an air passage 21 leading therethrough, and communicating with the central opening 18 of the flange piece, as at 22. Mounted in the part 20 is a hand-manipulated valve for controlling the passage of air through the passageway 21. This valve may be variously formed to discharge its stated function, but as herein shown it is formed by a plug 23 tapped or screw-threaded into a socket portion 24, Figs. 4 and 5, and provided with a diagonal air passage 25, Fig. 5, the construction being such that upon rotation of the plug 23, the diagonal passage 25 may be caused to register more or less with the passage 21 in the part 20, or such passage 21 may be entirely closed.

The plug valve 23 is preferably arranged so that it may be operated by the driver, and to this end the socket portion 24 into which the plug valve is threaded, is inclined to the plane of the flange piece 17, as indicated in Fig. 5, and the plug valve has projecting therefrom, a stem 26 surmounted by a hand-piece 27, Fig. 1, in convenient position for operation by the driver. From the construction thus far described, it will be apparent that by manipulation of the hand-piece 27, the flow of air through the passage 21 may be regulated as desired, or be entirely interrupted. In order that the plug valve may not be too easily turned as by the jar of the machine or vehicle, a spring 28, Fig. 5, is interposed between the lower end of the plug valve 23 and the bottom of the socket 24, but this may not be always necessary.

The part 20 is provided with an extension 29 having a chamber in which is a slide valve 30, said chamber being connected to the passage 21 above the plug valve 23 by a series of openings 31, Figs. 3, 5 and 6, and having an air inlet 32, the construction being such that by movement of the slide valve 30 varying numbers of the openings 31 may be placed in communication with the inlet 32 to thereby regulate the amount of air that may pass through the openings 31 into the passage 21.

Disposed between the slide valve 30 and one end of the valve chamber is a spring 33 normally acting to move the valve in a direction to uncover the openings 31, and to limit the maximum movement of the slide valve under the impulse of the spring, a stop is provided, that in the form of the invention illustrated consisting of a stem 34 secured to one end of the valve and extending through the end wall of the valve chamber where it is provided with a stop pin 35, substantially as indicated in Fig. 3.

The present invention contemplates that the slide valve shall be movable with the throttle, so that as the throttle is progressively opened to the position for the engine to run at moderate or desired speed, the air controlling slide valve shall likewise be opened to admit more and more air, until the desired speed is reached, at which time the air controlling slide valve will be fully opened and further opening movement of the throttle will not affect it.

As a means to this end, the slide valve 30, Fig. 3, is provided with an adjusting screw 36 having a head 37 adapted to be engaged by the operating arm 9 of the throttle, the construction being such that when the throttle is closed it will force the slide valve to closed position and as it is progressively opened, the spring 33 will cause the slide valve to follow the operating arm 9 until the stop 35 meets the end portion of the valve chamber or other fixed part. By means of the adjusting screw 36 the relation between the throttle and sliding valve movements may be regulated to fulfil the desired condition, and a set nut 38 may serve to maintain the established relation. In Fig. 2, the throttle operating arm 9 is shown in the position it occupies when the throttle is closed, and it will be noted that the slide valve 30 at this time covers and closes the openings 31, so that even should the plug valve 23 be open, no air can pass through the passage 21 to the intake pipe.

From the construction described, it will be noted that the amount of air admitted to the intake pipe is directly under the control of the throttle, so that as the throttle is progressively opened, the amount of air admitted will be progressively increased up to the point of the desired moderate speed, and thereafter further opening movement of the throttle will not alter the established combustion mixture. It may be desirable at times, owing to the character of the road, the load upon the engine, or atmospheric conditions, to change the proportion of air and fuel established by the coördinated relation of the throttle and slide valve movements, and at such times the hand-manipulated plug valve can be turned to modify the amount of air admitted by the slide valve. While in warm weather, a motor will ordinarily start with the throttle in its established closed position, yet in cold weather it is frequently necessary to further open the throttle. Such opening movement of the throttle, however, would also open the slide valve for the admission of air with the result that the mixture would not be sufficiently rich, but in the present invention by means of the plug valve, the passage 21 may be closed at such times thereby preventing air admitted by the slide valve from passing to the intake pipe and weakening the mixture.

An important feature of the present invention, in addition to the characteristics above-described, is that the entire device is self-contained, that is, the flange piece by which the device is adapted to be readily connected with the carbureter and intake pipe, also has fixedly associated therewith the parts containing the air passages, as well as the hand-operated and throttle-controlled valves, so that in adapting the device to motors as at present constructed, it is only necessary to attach the flange piece in position between the flanges of the carbureter and intake pipe. The flange piece and parts containing the air passages are preferably formed as a single casting, and the passage 21 and openings 31 are bored substantially as indicated in the drawing, the exterior portion of said openings being closed by a plug, such as the screw plug 40, Figs. 2, 4 and 6.

Obviously, many of the details described as a good, practical form of the invention may be changed within the true scope of the actual invention, the result in any case being that by the air supply means described, economy of fuel consumption is secured, and the efficiency of the motor and its operative condition are maintained.

What is claimed is:—

1. In a combustion engine, the combination of a throttle for controlling the volume of mixture admitted to the intake pipe, and air controlling means comprising a flange piece having an air passage communicating with the intake pipe and a projecting portion extending from the flange piece, a valve carried by the flange projection for regulating the amount of air admitted through said passage to the intake pipe, means coöperating with the throttle automatically to open said valve with the throttle to progressively increase the air supply through said passage to a predetermined point short of the full opening of the throttle, adjustable means to vary said predetermined point, and an additional valve carried by the flange projection between the air controlling valve and the intake pipe, and a stem for adjusting the valve at will.

2. A self-contained air controlling device for combustion engines, comprising a flange provided with an opening adapted to be secured between the carbureter and intake pipe leading to the engine and having a projecting portion containing an air passage leading to the central opening of the flange, an air controlling valve for regulating the amount of air admitted through said passage of the flange projection to the intake pipe, a stem secured to the valve and coöperating with the throttle to automatically open the valve to progressively increase the air supply, another valve also carried by the flange between the intake pipe and air controlling valve, and manually operable means for controlling said other valve to independently regulate the flow of air from the air admission valve to the intake pipe.

3. In a combustion engine, the combination of a throttle for controlling the volume of mixture admitted to the intake pipe, and air controlling means comprising a member having an air passage communicating with the intake pipe, a valve for regulating the amount of air admitted through said passage to the intake pipe, means coöperating with the throttle automatically to open said valve to progressively increase the air supply through said passage, an additional valve located in said passage between said air controlling valve and the intake pipe, and manually operable means for controlling said additional valve to independently regulate the flow of air from the air admission valve to the intake pipe.

4. In a combustion engine, the combination of a member adapted to be inserted between the carbureter and intake pipe of the engine, said member having an air passage communicating with the outside air and the intake pipe, a valve for regulating the amount of air admitted through said passage to the intake pipe, means for progressively opening said valve automatically on opening of the throttle, a valve for said passage between said first-named valve and the intake pipe, and means independently to control said second-named valve to regulate the amount of air delivered from the first-named valve to the intake pipe.

5. In a device of the character described, the combination of a throttle having an operating arm, a flange piece having an air passage leading to the intake pipe, a slide valve having an adjustable contact part adapted to be engaged by the throttle operating means at times for controlling the flow of air through said passage, and a valve independent of the throttle and slide valve and interposed between the slide valve and intake pipe for regulating at will the amount of air passing from the slide valve to the intake pipe.

6. An air supply device for combustion engines, comprising a flange piece having projecting portions, said flange piece and projecting portions having an air passage, a throttle and its operating means, a slide valve movable independent of but adapted to be engaged by the throttle operating means at times for controlling the amount of air admitted to said air passage, and a hand operated valve extending across the air passage leading from the slide valve to the intake pipe for regulating the amount of air admitted by the slide valve that may pass through said passage.

In testimony whereof, I have signed my name to this specification, in the presence of two subscribing witnesses.

CHARLES F. ROPER.

Witnesses:
BERTHA A. WILSON,
ETHEL M. RALPHS.